United States Patent [19]

Honigs

[11] Patent Number: 5,055,684
[45] Date of Patent: Oct. 8, 1991

[54] SYSTEM TO REDUCE WAVE SHIFT ERROR IN SPECTROPHOTOMETER CAUSED BY HOT SPOTS IN THE LIGHT SOURCE

[75] Inventor: David E. Honigs, Laurel, Md.

[73] Assignee: NIRSystems Incorporated, Silver Spring, Md.

[21] Appl. No.: 446,595

[22] Filed: Dec. 6, 1989

[51] Int. Cl.⁵ .................................. G01J 3/42
[52] U.S. Cl. .................................. 250/339; 356/323; 356/319
[58] Field of Search ................ 356/323, 319; 250/339

[56] References Cited

U.S. PATENT DOCUMENTS

| | | |
|---|---|---|
| 3,247,758 | 6/1966 | Turner. |
| 3,924,925 | 12/1975 | Gale et al. ........................ 350/3.77 |
| 4,070,111 | 1/1978 | Harrick ............................. 356/323 |
| 4,241,998 | 12/1980 | Farkas et al. .................... 356/319 |
| 4,285,596 | 8/1981 | Landa ............................... 356/308 |
| 4,529,308 | 7/1985 | Rife .................................. 356/323 |
| 4,652,761 | 3/1987 | Kerr et al. ........................ 250/372 |
| 4,770,530 | 9/1988 | Van Aken et al. ............... 356/323 |

Primary Examiner—Carolyn E. Fields
Assistant Examiner—James E. Beyer
Attorney, Agent, or Firm—Lane, Aitken & McCann

[57] ABSTRACT

An improved near infrared spectrophotometer is disclosed which reduces wave shift errors arising from hot spots in a light source. A ground quartz plate uniformly diffuses radiation from the light source to evenly illuminate the entrance slit for a diffraction grating. Radiation emerges from the entrance slit with a uniform angular intensity distribution and is dispersed into a spectrum by a reflecting diffraction grating towards an exit slit. A narrow wavelength band of radiation passes through the exit slit to illuminate a sample. Because the entrance slit is uniformly illuminated, without regard to variations in radiation intensity due to hot spots in the source, wave shift errors in the reflectivity measurements for the sample are reduced.

14 Claims, 1 Drawing Sheet

SYSTEM TO REDUCE WAVE SHIFT ERROR IN SPECTROPHOTOMETER CAUSED BY HOT SPOTS IN THE LIGHT SOURCE

BACKGROUND OF THE INVENTION

This invention relates to a spectrophotometer using near infrared energy to irradiate samples.

Spectrophotometry determines the concentration of components in a sample by measuring transmission of radiation through or reflection of radiation from a test samples at narrow wavelength bands.

Radiation generated by a light source enters the spectrophotometer through an entrance slit. The light passing through the slit illuminates an oscillating diffraction grating which disperses the light into a spectrum. The spectrum is imaged across an exit slit and a narrow wavelength component of the spectrum passes through the exit slit and illuminates a sample after passing through exit slit optics. As the grating oscillates the wavelength of the spectral component irradiating the sample is swept through the spectrum. Accurate sample analysis hinges on the consistency of the angular position of the spectrum dispersed from the grating and errors in spectral measurements can arise due to inconsistencies in the light source. For example, the light intensity across the entrance slit can vary due to hot spots in the lamp. The resulting uneven illumination of the slit causes an apparent shift in the position of the slit and in the spectrum dispersed from the grating. Consequently, in near infrared spectrophotometric analysis, wave shift error of up to two nanometers can sometimes occur when the lamp is changed, thus requiring recalibration of the instrument or otherwise reducing the accuracy of the analysis provided by the instrument.

The prior art has employed fiber optics to uniformly illuminate the entrance slit, with some success. However, the fibers attenuate the radiation from the light source, reducing the intensity of radiation illuminating the sample, thus reducing the signal to noise ratio in the output signal from the spectrophotometer.

SUMMARY OF THE INVENTION

The present invention is a system which lessens wave shift errors in spectrophotometric readings without the radiation losses related to fiber optics.

The invention employs a spectrophotometer with a ground quartz plate located between a light source, such as a filament lamp, and the entrance slit of the spectrophotometer. To minimize radiation losses in the space between the source and the slit, the quartz plate is positioned immediately adjacent to the slit. Because the ground surface of the quartz plate diffuses light from the light source, the entrance slit is evenly illuminated. Notwithstanding variations in the incident radiation from the light source, the light projected from the slit is uniformly distributed through an angle of projection spanning the grating so that the grating is uniformly illuminated. The grating then produces a predictable spectrum across the exit slit and facilitates accurate measurement of the sample's reflectivity.

DETAILED DESCRIPTION OF THE INVENTION

Figure 1:
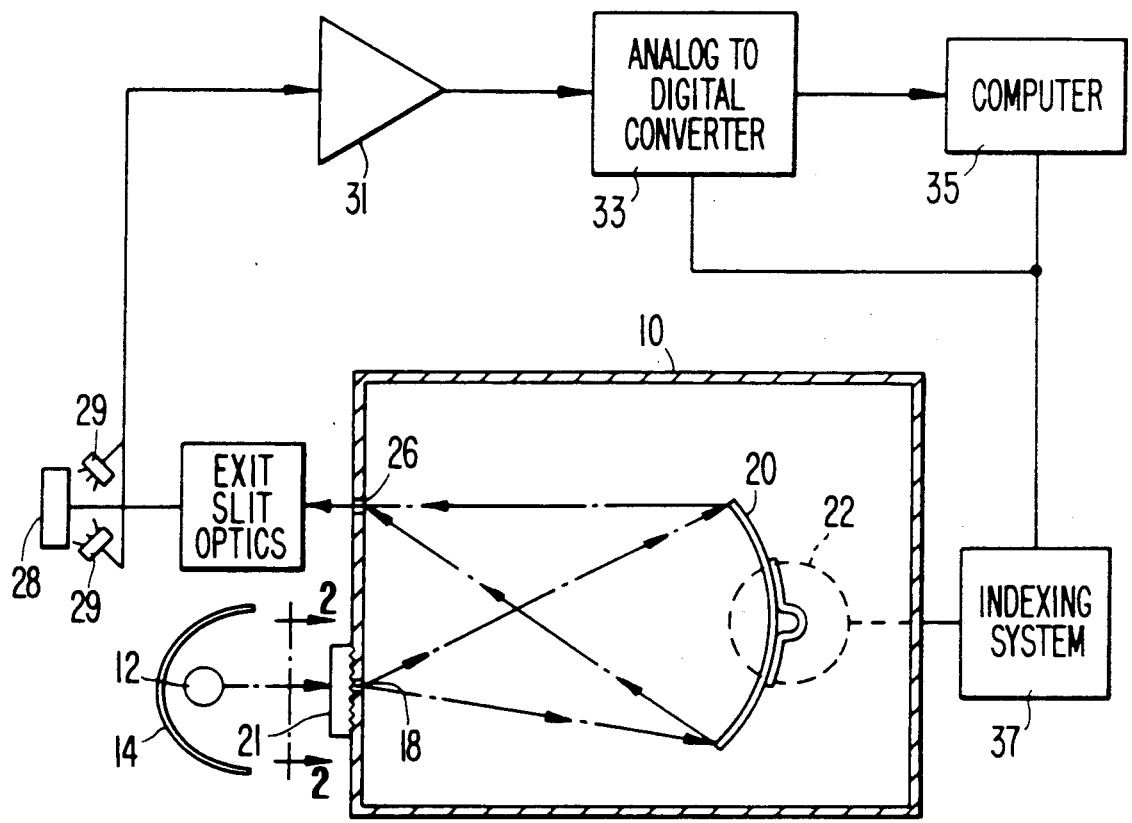
FIG. 1 is a schematic drawing of a spectrophotometer according to the present invention.
Figure 2:
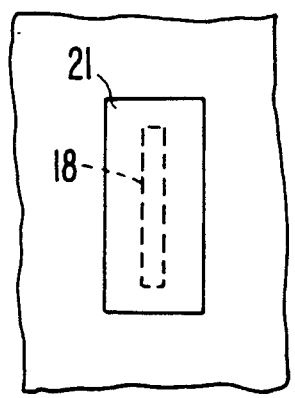
FIG. 2 is an enlarged fragmented view in elevation showing the quartz plate in front of the entrance slit of the spectrophotometer and taken along line 2—2 of FIG. 1.

As shown in FIGS. 1 and 2, the instrument of the invention comprises a housing 10 containing a concave holographic reflection diffraction grating 20, positioned to be illuminated through an entrance slit 18 by a light source 12 in the form of a linear filament infrared lamp. The lamp 12 generates light with wavelengths distributed through the near infrared spectrum. A reflector 14 in the shape of an elliptical cylinder, partially encircles the light source to reflect light radiated by the light source 12 toward the entrance slit 18. The elliptical cylindrical shape of the reflector defines a proximal focal line along which the linear filament of the light source 10 is positioned and a distal focal line located approximately along the entrance slit 18 so that an image of the filament is focused near the entrance slit. Between the light source 12 and the entrance slit 18 is an infrared light transmitting plate 21 having a light diffusing interface. The infrared light transmitting plate comprises a quartz plate adjacent to the slit 18 with a ground surface facing the slit. The ground surface is the light diffusing interface. Infrared light from the source 12 is transmitted through the plate to the ground surface where the infrared light is diffused to uniformly illuminate the entrance slit 18.

The slit 18 projects the light with a uniform angular distribution toward diffraction grating 20, which is oscillated at high speed by means of a direct drive motor 22. The details of the direct oscillating motor drive are disclosed in copending application Ser. No. 294,679, filed Jan. 9, 1989 invented by Phillip A. McGee, and assigned to the assignee of this application. The grating 20 disperses the infrared light from the slit 18 into a spectrum reflected toward an exit slit 26. A narrow wavelength band from the spectrum passes through the exit slit 26 and through exit slit optics before illuminating sample 28. As the grating oscillates, the center wavelength of the light passing through the exit slit is scanned through the infrared spectrum. Photodetectors 29 detect the intensity of the resulting radiation reflected from the sample and generate an output signal representing this intensity. The output signal of the photodetectors 29 is amplified by an amplifier 31 and applied to an analog-to-digital converter 33.

As the grating oscillates and the center wavelength of the narrow band passing through the exit slit is scanned through the spectrum, the analog to digital converter converts the output analog signal of the amplifier to digital values at incremental index points distributed through the spectrum so that a set of digital values are obtained representing the intensity of the reflected energy from the sample as the wavelength irradiating the sample varies throughout the spectrum. These digital values are received and processed by a computer 35.

As shown in FIG. 1, a shaft position indexing system 37 coupled to the motor 22 transmits pulses to the analog-to-digital converter 33 and to the computer 35 as the motor 22 pivots the grating 20 and scans the wavelength applied to the sample through the spectrum. In response to each applied pulse, the analog-to-digital converter converts the analog signal received from the amplifier 31 to a digital value and in this manner generates digital values representing the intensity of the reflected radiation at increments distributed through the spectrum. A computer 35 counts the pulses received from the indexing system 37 and thereby monitors the angular position of the grating 20 and the center wavelength of the band currently being transmitted through the exit slit.

Thus, the computer 35 monitors the wavelength of the band which caused the reflected intensity represented by the digital signal currently applied to the computer by the analog to digital converter. Because the entrance slit is uniformly illuminated as a result of the ground quartz plate, the shaft position on which the grating is mounted can be accurately calibrated in terms of the wavelength being transmitted through the exit slit. Without the ground quartz plate to ensure uniform illumination of the exit slit, variations in the illumination of the entrance slit caused by hot spots in the light source would cause an apparent shift in the entrance slit and cause a corresponding shift in the spectrum reflected by the grating, so that for a given shaft position of the grating the wavelength transmitted through the exit slit might vary by as much as 2 nanometers when the lamp is replaced. With the ground quartz plate distributing the light from the light source uniformly over the entrance slit in accordance with the present invention, the shift in wavelength caused by variations in the light source is reduced to 2/100 of a nanometer. Thus, with the system of the present invention, the system does not need to be recalibrated when the lamp of the light source is replaced.

The above description is of preferred embodiment of the invention and modification may be made thereto without departing from the spirit and scope of the invention, which is defined in the appended claims.

I claim:

1. A spectrophotometric instrument comprising a housing defining an entrance slit, an optical grating within said housing positioned to be irradiated with light transmitted through said entrance slit and to disperse the received light into a spectrum, a broad spectrum light source positioned external to said housing so as to direct broad spectrum light toward said entrance slit, and light diffusion means to uniformly illuminate said entrance slit with light radiated from said light source, said light diffusion means comprising a plate transmissive to said broad spectrum light positioned between said light source and said entrance slit, said plate having a light diffusing interface between said light source and said entrance slit to diffuse the light transmitted from said source toward said entrance slit.

2. A photometric instrument as recited in claim 1, wherein said light diffusing interface comprises a ground surface on said plate.

3. A spectrophotometric instrument as recited in claim 2, wherein said light diffusing interface is on a surface of said plate facing said entrance slit.

4. A spectrophotometric instrument as recited in claim 1, wherein said light source is an infrared light source and said broad spectrum light is in the near infrared wavelength band, and wherein said plate is a quartz plate.

5. A spectrophotometric instrument as recited in claim 4, wherein said light diffusing interface is a ground surface of said plate.

6. A spectrophotometric instrument as recited in claim 1, wherein said plate is located adjacent to said entrance slit.

7. A spectrophotometric instrument as recited in claim 6, wherein said light diffusing interface is on a surface of said plate facing said entrance slit.

8. A spectrophotometric instrument as recited in claim 7, wherein said light diffusing interface is a ground surface of said plate.

9. A spectrophotometric instrument as recited in claim 1, wherein said light source comprises a filament lamp having its filament arranged parallel with the long dimension of said entrance slit.

10. A spectrophotometric instrument as recited in claim 9, wherein said light source further comprises a reflector arranged to focus an image of said filament near said entrance slit.

11. A spectrophotometric instrument as recited in claim 10, wherein said plate is located adjacent to said entrance slit.

12. A spectrophotometric instrument as recited in claim 11, wherein said light diffusing interface is a surface of said plate facing said entrance slit.

13. A spectrophotometric instrument as recited in claim 11, wherein said light diffusing interface is a ground surface of said plate.

14. A spectrophotometric instrument as recited in claim 1, wherein said light diffusing interface is on a surface of said plate facing said entrance slit.

* * * * *